United States Patent [19]
Suzuki

[11] Patent Number: 5,880,773
[45] Date of Patent: Mar. 9, 1999

[54] HEAD MOUNTED DISPLAY CONFIGURED TO A USER'S PHYSICAL FEATURES

[75] Inventor: Yoshiaki Suzuki, Tokyo, Japan

[73] Assignee: Sony Corporation, Japan

[21] Appl. No.: 990,458

[22] Filed: Dec. 15, 1992

[30] Foreign Application Priority Data

| Dec. 27, 1991 | [JP] | Japan | 3-346364 |
| Dec. 27, 1991 | [JP] | Japan | 3-346365 |
| Jan. 14, 1992 | [JP] | Japan | 4-004440 |
| Jan. 21, 1992 | [JP] | Japan | 4-008013 |

[51] Int. Cl.$^6$ ............................................. H04N 7/18
[52] U.S. Cl. .................................. 348/115; 345/8; 348/53; 348/721
[58] Field of Search ................ 358/104, 88; 345/8, 345/7; 340/980; 348/121, 42, 40, 41, 51, 53, 55, 56, 115

[56] References Cited

U.S. PATENT DOCUMENTS

| H833 | 11/1990 | Brindle . | |
| 2,955,156 | 10/1960 | Heilig | 358/88 |
| 4,154,513 | 5/1979 | Goulden | 351/47 |
| 4,636,866 | 1/1987 | Hattori | 358/236 |
| 4,695,129 | 9/1987 | Faessen et al. | 350/96.25 |
| 4,706,117 | 11/1987 | Schoolman | 358/88 |
| 4,933,755 | 6/1990 | Dahl et al. | 358/88 |
| 4,952,024 | 8/1990 | Gale | 350/143 |
| 5,003,300 | 3/1991 | Wells | 345/8 |
| 5,034,809 | 7/1991 | Katoh | 358/88 |
| 5,124,840 | 6/1992 | Trumbull et al. | 358/88 |
| 5,187,503 | 2/1993 | Hilton | 351/128 |

FOREIGN PATENT DOCUMENTS

| 0077193 | 4/1983 | European Pat. Off. . |
| 0257409 | 3/1988 | European Pat. Off. . |
| 0403701 | 12/1990 | European Pat. Off. . |
| 0438362 | 7/1991 | European Pat. Off. . |
| 354738 | 10/1905 | France . |
| 2123976 | 2/1984 | United Kingdom . |
| 2166887 | 5/1986 | United Kingdom . |
| 9104508 | 4/1991 | WIPO . |

OTHER PUBLICATIONS

European Search Report A Miniature Virtual Display Implement, Optoelectronics, vol. 6, No. 1 pp. 155–162, Jun., 1991.

*Primary Examiner*—Bryan Tung
*Attorney, Agent, or Firm*—Ronald P. Kananen

[57] ABSTRACT

A goggle type image display apparatus including left and right image display optical blocks, an optical block distance adjusting mechanism for adjusting the distance between the left and right optical blocks, and a housing for containing the left and right optical blocks and the optical block distance adjusting mechanism. The left and right optical blocks and the optical block distance adjusting mechanism are removably mounted as a unit on a support frame within the housing.

3 Claims, 11 Drawing Sheets

HEAD MOUNTED DISPLAY CONFIGURED TO A USER'S PHYSICAL FEATURES

BACKGROUND OF THE INVENTION

This invention relates to a goggle type image display apparatus having a distance adjusting mechanism for adjusting the distance between left and right optical blocks to bring them in alignment with the operator's eyes.

For example, U.S. Pat. Nos. 4,933,755, 4,695,129 and 4,636,866 each disclose a goggle type image display apparatus wearable like a goggle to permit a user to see the image presented on image display optical blocks such as liquid crystal displays. The goggle type image display apparatus includes left and right optical blocks, an optical block distance adjusting mechanism for adjusting the distance between the optical blocks to bring them into alignment with the eyes, a goggle-shaped housing (cover) for containing the left and right optical blocks and the optical block distance adjusting mechanism, and left and right bows attached to the left and right sides of the housing. The left and right bows are used to wear it like a goggle. The optical block distance adjusting mechanism is used to bring the left and right optical blocks into alignment with the left and right eyes so that the user can see the image presented on the left and right optical blocks with his left and right eyes.

However, the conventional goggle type image display apparatus is arranged to attach the left and right optical blocks and the optical block distance adjusting mechanism directly to the housing. This arrangement requires for the housing to have a sufficient mechanical strength and results in a complex housing structure. In addition, the relative position between the optical blocks cannot be adjusted before the optical block distance adjusting mechanism is attached to the housing. Furthermore, the optical blocks and the optical block distance adjusting mechanism cannot be adjusted or repaired without disassembling the image display apparatus.

SUMMARY OF THE INVENTION

A main object of the invention is to solve the problems associated with the conventional goggle type image display apparatus.

It is another object of the invention to provide an improved goggle type image display apparatus which can be assembled and disassembled with ease.

It is another object of the invention to provide an improved goggle type image display apparatus which can adjust the positions of the optical blocks and the optical block distance adjusting mechanism with ease.

It is still another object of the invention to provide an improved goggle type image display apparatus which has a simple housing structure.

In accordance with the invention, there is provided a goggle type image display apparatus wearable on a user's head for presenting a visible image thereon. The image display apparatus comprises left and right optical blocks each having display means for representing an image thereon, a goggle-shaped housing for containing the left and right optical blocks, a support frame for slidably supporting the left and right optical blocks, and distance adjusting means mounted on the support frame for sliding the left and right optical blocks along the support frame toward and away from each other within the housing.

In another aspect of the invention, there is provided a goggle type image display apparatus wearable on a user's head for presenting a visible image thereon. The image display apparatus comprises left and right optical blocks each having a liquid crystal display for presenting an image thereon, a light provided on the rear side of the liquid crystal display for illuminating the image presented on the liquid crystal display, an eye lens on which the image illuminated by the light is incident, and a lens support member for supporting the eye lens for movement to provide a variable focal distance. The image display apparatus also includes a support frame for slidably supporting the left and right optical blocks, a goggle-shaped housing for containing the left and right optical blocks and the support frame, distance adjusting means mounted on the support frame for sliding the left and right optical blocks along the support frame toward and away from each other within the housing, mounting means for mounting the support frame on the housing with the left and right optical blocks and the distance adjusting means being attached on the support frame, and a head band rotatably attached at the opposite ends thereof to the housing, the head band being capable of folding over the housing.

BRIEF DESCRIPTION OF THE DRAWINGS

This invention will be described in greater detail by reference to the following description taken in connection with the accompanying drawings, in which.

DETAILED DESCRIPTION OF THE INVENTION

Figure 1:
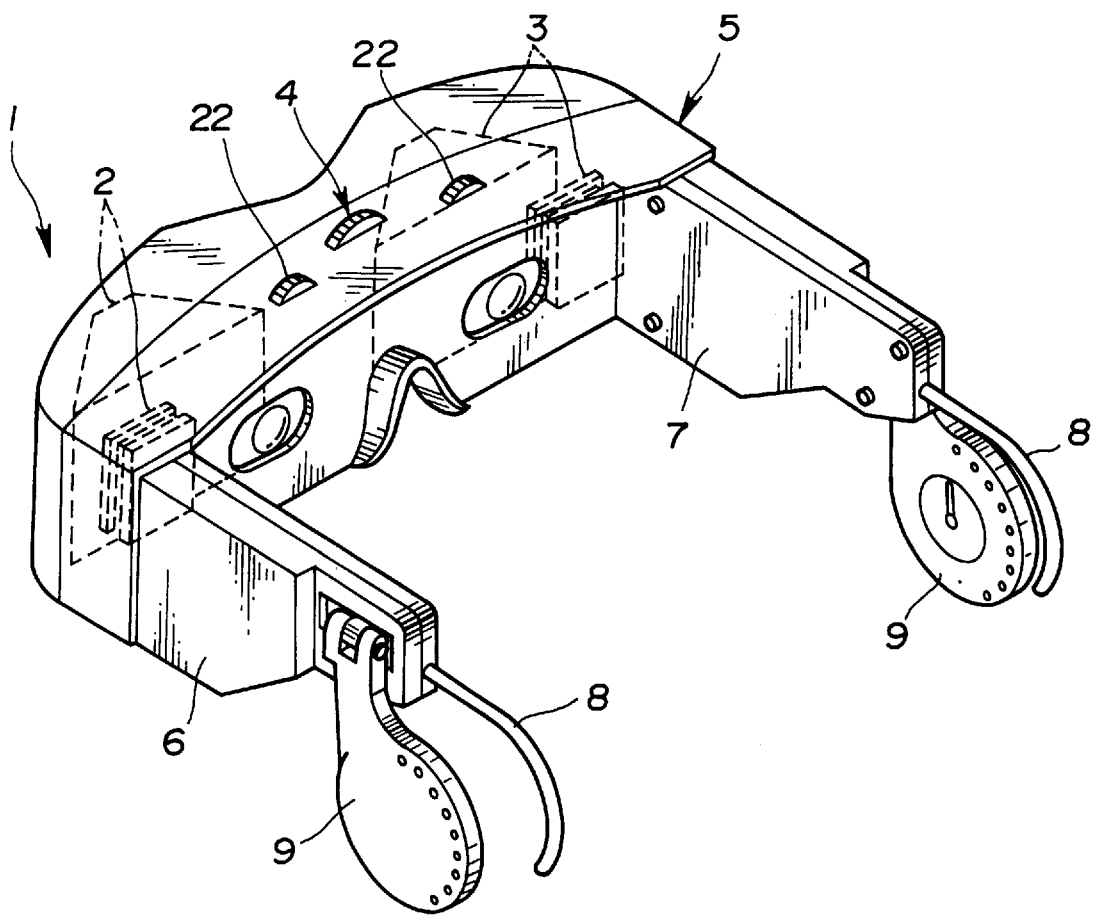
FIG. 1 is a perspective view showing one embodiment of a goggle type image display apparatus made in accordance with the invention.
Figure 2:
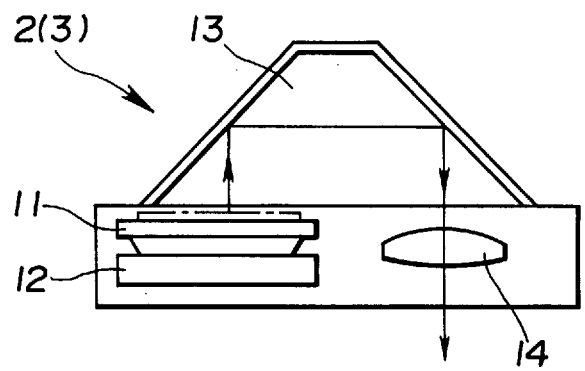
FIG. 2 is a plan view showing the optical block used in the goggle type image display apparatus of FIG. 1.

With reference to the drawings, and in particular to FIG. 1, there is shown a goggle type image display apparatus embodying the invention. The goggle type image display apparatus, generally designated by the numeral 1, includes left and right image display optical blocks 2 and 3, an optical block distance adjusting mechanism 4 for adjusting the distance between the left and right optical blocks 2 and 3, a goggle-shaped housing (cover) 5 which contains the left and right optical blocks 2 and 3 and the optical block distance adjusting mechanism 4, left and right side cases 6 and 7 positioned on the left and right sides of the housing 5, bows 8, and earphones 9 attached to the side cases 6 and 7. As shown in FIG. 2, each of the optical blocks 2 and 3 includes a liquid crystal display (LCD) 11, a back light 12 positioned in rear of the display 11, a prism 13, and an eye lens (non-spherical lens) 14. The back light 12 is used to illuminate the image presented on the liquid crystal display 11. The illuminated image is refracted and incident upon the eye lens 14.

Figure 3:
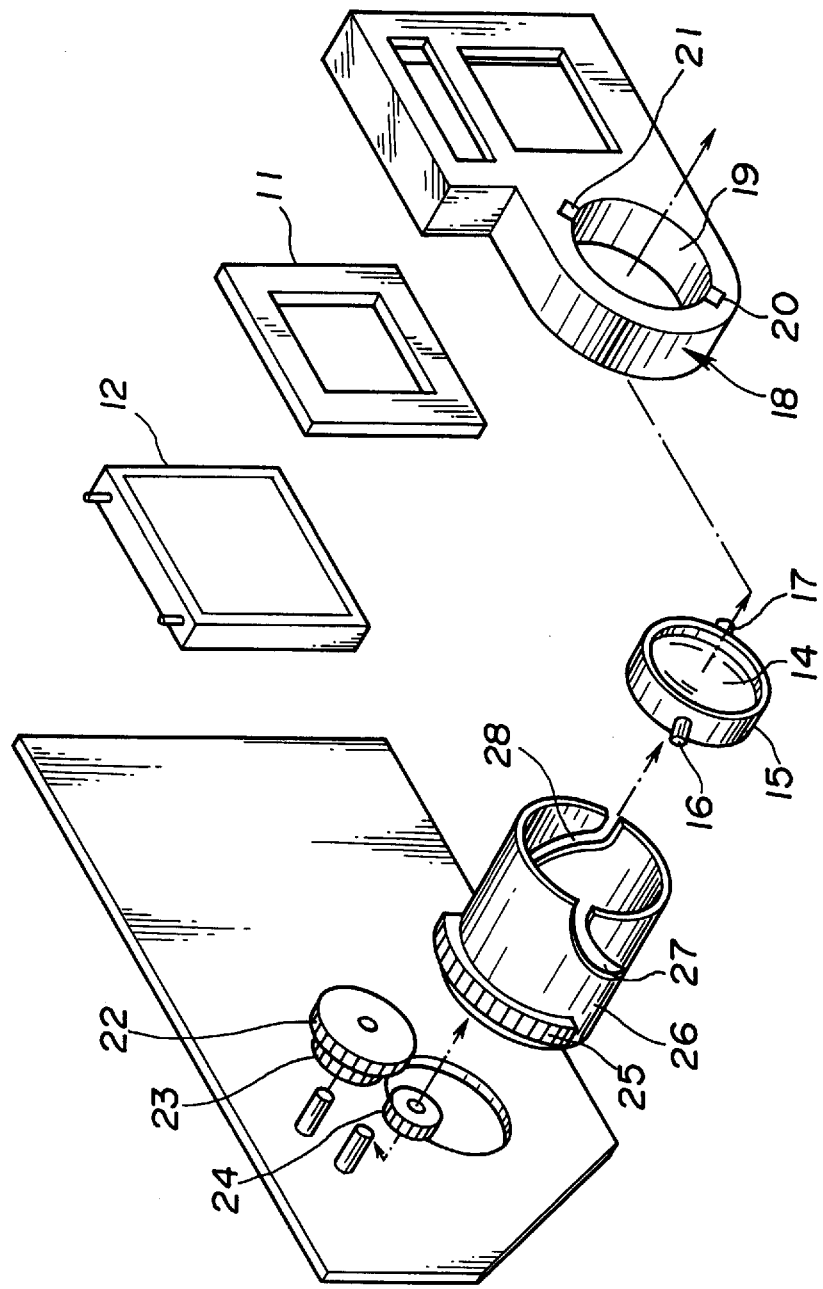
FIG. 3 is an exploded perspective view of the optical block used in the goggle type image display apparatus of FIG. 1.

Referring to FIG. 3, the eye lens 14 is mounted on a lens support ring 15. A pair of projections 16 and 17 are formed on the outer peripheral surface of the lens support ring 15 and spaced at an angular distance of 180°. The projections 16 and 17 are inserted in slits 20 and 21 formed in the inner peripheral surface of a lens support bore 19 formed in a spacer 18 so that the lens support ring 15 and the eye lens 14 can slide within the lens support bore 19. When a visibility adjusting dial 22 is rotated to adjust the visibility, a cylindrical lens bracket 26 rotates through the gear 23 provided on the dial 22, a pinion 24 and a gear 25. As a result, a pair of inclined projection operating slits 27 and 28 formed in the lens bracket 26 push the projections 16 and 17 to slide the lens support ring 15 and the eye lens 14 forward and rearward so as to change the focal distance of the eye lens 14.

Figure 4:
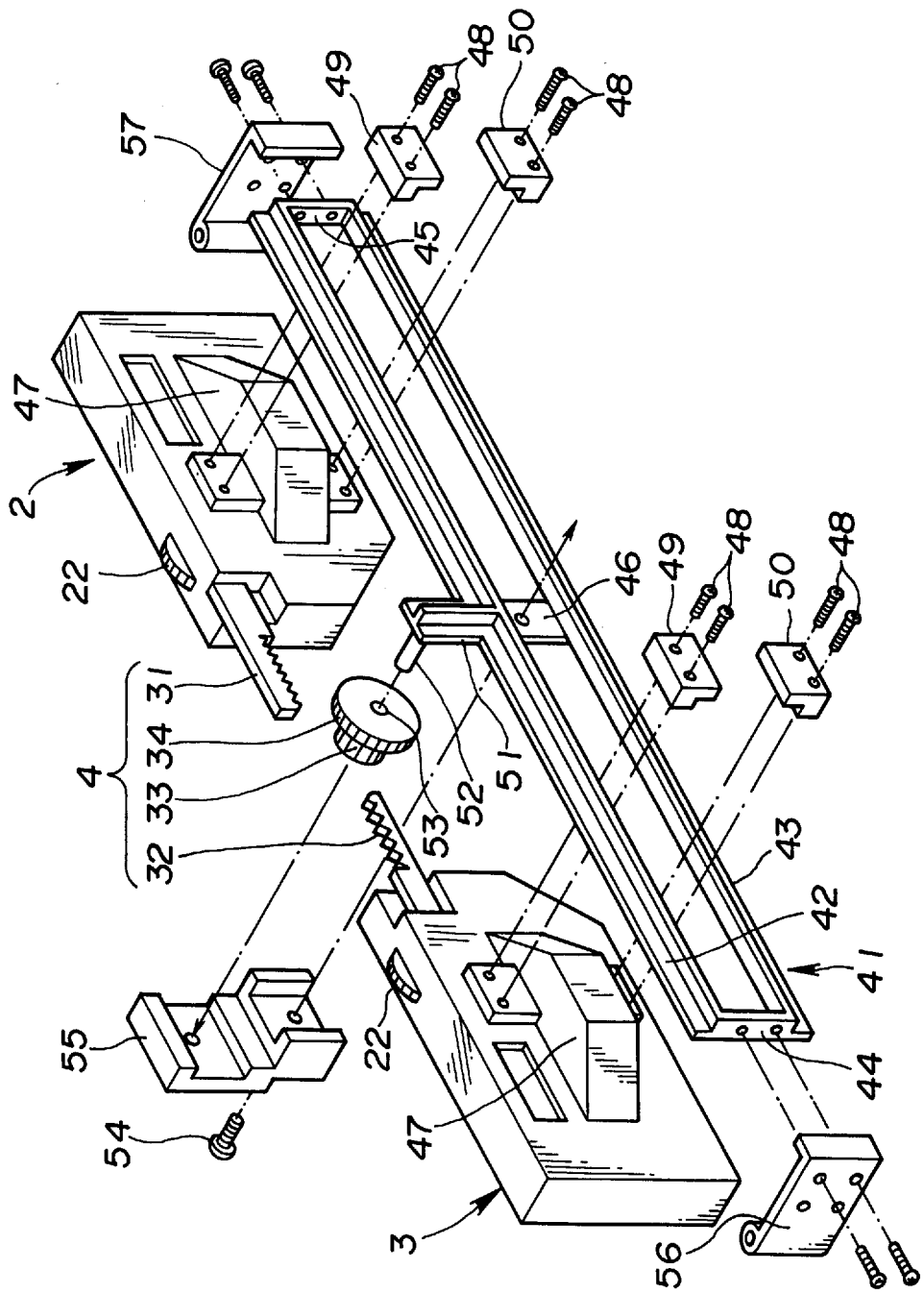
FIG. 4 is an exploded perspective view of the optical block distance adjusting mechanism used in the goggle type image display apparatus of FIG. 1.
Figure 5:
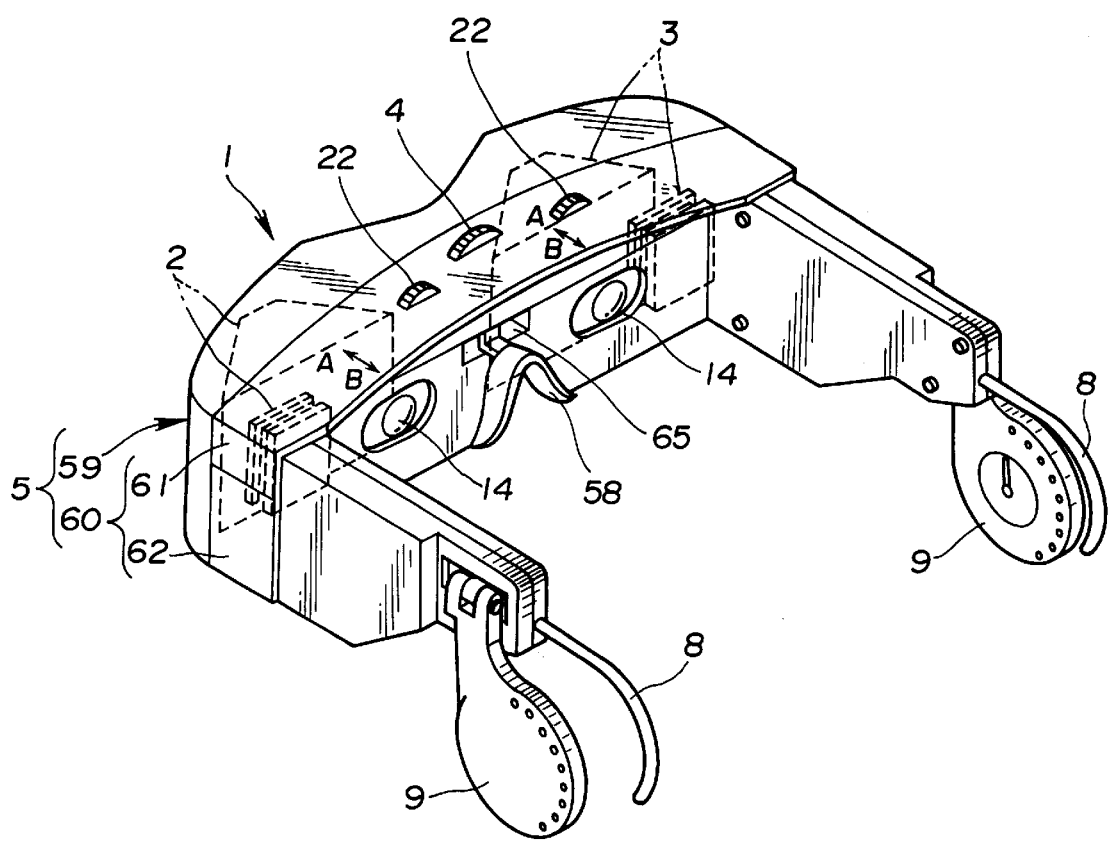
FIG. 5 is a perspective view showing an alternative embodiment of the goggle type image display apparatus of the invention.

Referring to FIG. 4, the optical block distance adjusting mechanism 4 includes a pair of racks 31 and 32 provided on the left and right optical blocks 2 and 3, a pinion 33 held in mesh engagement with the racks 31 and 32, and a distance adjusting dial 34 on which the pinion is provided on its side surface. When the distance adjusting dial 34 is rotated in one direction, the left and right optical blocks 2 and 3 slide toward each other. When the distance adjusting dial 34 is rotated in the other direction, the left and right optical blocks 2 and 3 slide away from each other. The left and right optical blocks 2 and 3 and the optical block distance adjusting mechanism 4 are mounted on a support frame 41. The optical blocks 2 and 3, the optical block distance adjusting mechanism 4 and the support frame 41 are provided as a unit. The support frame 41 is formed in a square or rectangular form including upper and lower rails 42 and 43 parallel with each other, left and right coupling members 44 and 45 coupling the left and right ends of the rails 42 and 43, and a center coupling member 46 coupling the centers of the rails 42 and 43. A projection 47 is provided on one side of each of the optical blocks 2 and 3 for a prism. The projection 47 is placed between the upper and lower rails 42 and 43. Upper and lower brackets (sliders) 49 and 50 are attached through bolts 48 . . . 48 to the respective upper and lower portions of the projection 47 to hold the upper and lower rails 42 and 43 so that the left and right optical blocks 2 and 3 can slide along the support frame 41 toward and away from each other.

A dial support member 51 extends from the center of the upper rail 42 of the support frame 41. The dial support member 51 has a dial support shaft 52 at its upper portion. The dial support shaft 52 is inserted on a bearing hole 53 formed in the distance adjusting dial 34 and the pinion 33 so that the distance adjusting dial 34 and the pinion 33 are mounted rotatably on the support frame 41. The upper and lower portions of the pinion 33 are held in mesh engagement with the racks 31 and 32 formed on the left and right optical blocks 2 and 3. The distance adjusting dial 34, the pinion 33 and the racks 31 and 32 are supported by a rack holder 55 attached to one side surface of the support frame 41 by means of a bolt 54. The numerals 56 and 57 designate hinges for the left and right side cases mounted to the left and right coupling members 44 and 45 of the support frame 41.

In such a manner, the left and right optical blocks 2 and 3 and the optical block distance adjusting mechanism 4 are attached to the support frame 41. After the positions of the optical blocks 2 and 3 and the optical block distance adjusting mechanism 4 are adjusted, the support frame 41 is mounted on the housing 5. The side cases 6 and 7 are attached to the hinges 56 and 57.

In the goggle type image display apparatus of the invention, the brackets 49 and 50 are used to securely attach the optical blocks 2 and 3 to the support frame 41 for sliding movement with ease. The dial support shaft 52 provided on the support frame 41 is used to securely attach the optical block distance adjusting mechanism 4 to the support frame with ease. Since the pinion 33 engages with the racks 31 and 32 of the optical blocks 2 and 3 after the optical blocks 2 and 3 are positioned in place, it is possible to adjust the positions of the optical blocks 2 and 3 and the optical block distance adjusting mechanism 4 with ease.

Referring to FIGS. 5 to 8, there is illustrated a second embodiment of the goggle type image display apparatus of the invention. Like reference numerals have been applied to FIGS. 5 to 8 with respect to the equivalent components used in the first embodiment.

In this embodiment, the goggle type image display apparatus 1 includes left and right image display optical blocks 2 and 3, a goggle-shaped housing (cover) 5 to which the optical blocks 2 and 3 are attached, and a nose pad 58 mounted on the cover 5. The nose pad 58 is mounted on the cover 5 for movement to the left and right between the eye lenses 14, 14 which constitute the left and right optical blocks 2 and 3. Visibility adjustment dials 22 and 22 are provided to move the eye lenses 14 and 14 of the left and right optical blocks 2 and 3 in the directions indicated by the arrows A and B of FIG. 5 so as to adjust the visibility.

Figure 6:
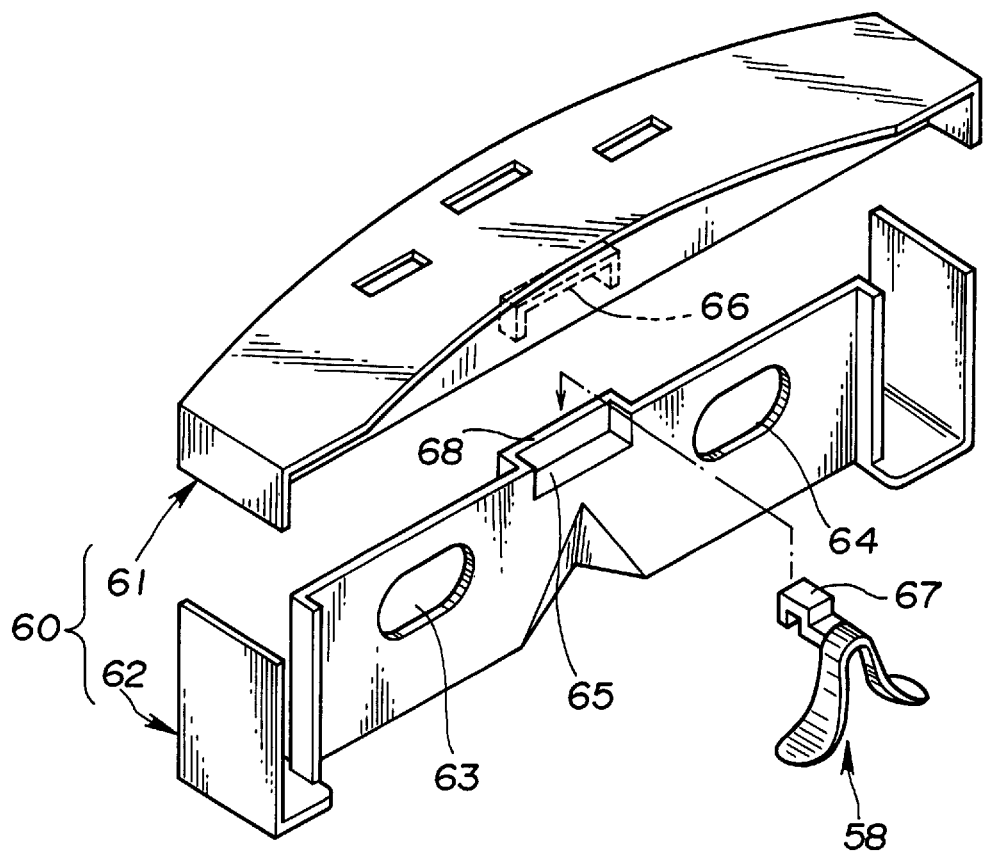
FIG. 6 is an exploded perspective view showing the lower cover used in the goggle type image display apparatus of FIG. 5.
Figure 7:
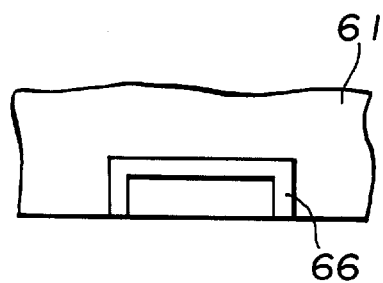
FIG. 7 is an elevational view showing the projection of the lower cover of FIG. 6.

The cover 5 is divided into front and rear covers 59 and 60. The rear cover 60 is further divided into upper and lower covers 61 and 62, as shown in FIG. 6. The lower cover 62 is formed with windows 63 and 64 facing to the left and right eye lenses 14 and 14 of the left and right optical blocks 2 and 3. A recess 65 is formed between the windows 63 and 64 for attachment to the nose pad. The upper cover 61 is formed with a projection 66 at a position corresponding to the recess 65 of the lower cover 62, as shown in FIG. 7. The nose pad 58 has a portion 67 having a U-shaped cross section for engagement with the upper end of the bottom surface 68 of the recess 65 so that the nose pad 58 can be mounted on the lower cover 62 for sliding movement to the left and right within the recess 65. When the upper cover 61 is mounted on the lower cover 62, the projection 66 of the upper cover 61 pushes the portion 67 so as to prevent separation of the nose pad 58 from the lower cover 62.

After the user wears the goggle type image display apparatus of this embodiment, he may use the lens distance adjustment dial 4 to bring the left and right eye lenses 14 and 14 in alignment with the left and right eyes while holding the left and right side portions of the cover 5. In this case, the user can move the nose pad 58 carried on his nose to the left or right so as to adjust the distance between the left and right eye lenses 14 and 14 and the position of the nose pad 58 by moving the cover 5 to the left or right with his hands.

Although the nose pad 58 cannot slide under the resistance of friction between the portion 67 and the recess 65 without exerting a pressure exceeding a predetermined value, it is preferable to further suppress the sliding movement of the nose pad 58 by a leaf spring mounted on the portion 67. It is also preferable to provide a lock button on the lower cover 62 so as to prevent the movement of the nose pad 58 after the adjustment of the position of the nose pad 58.

Figure 8:
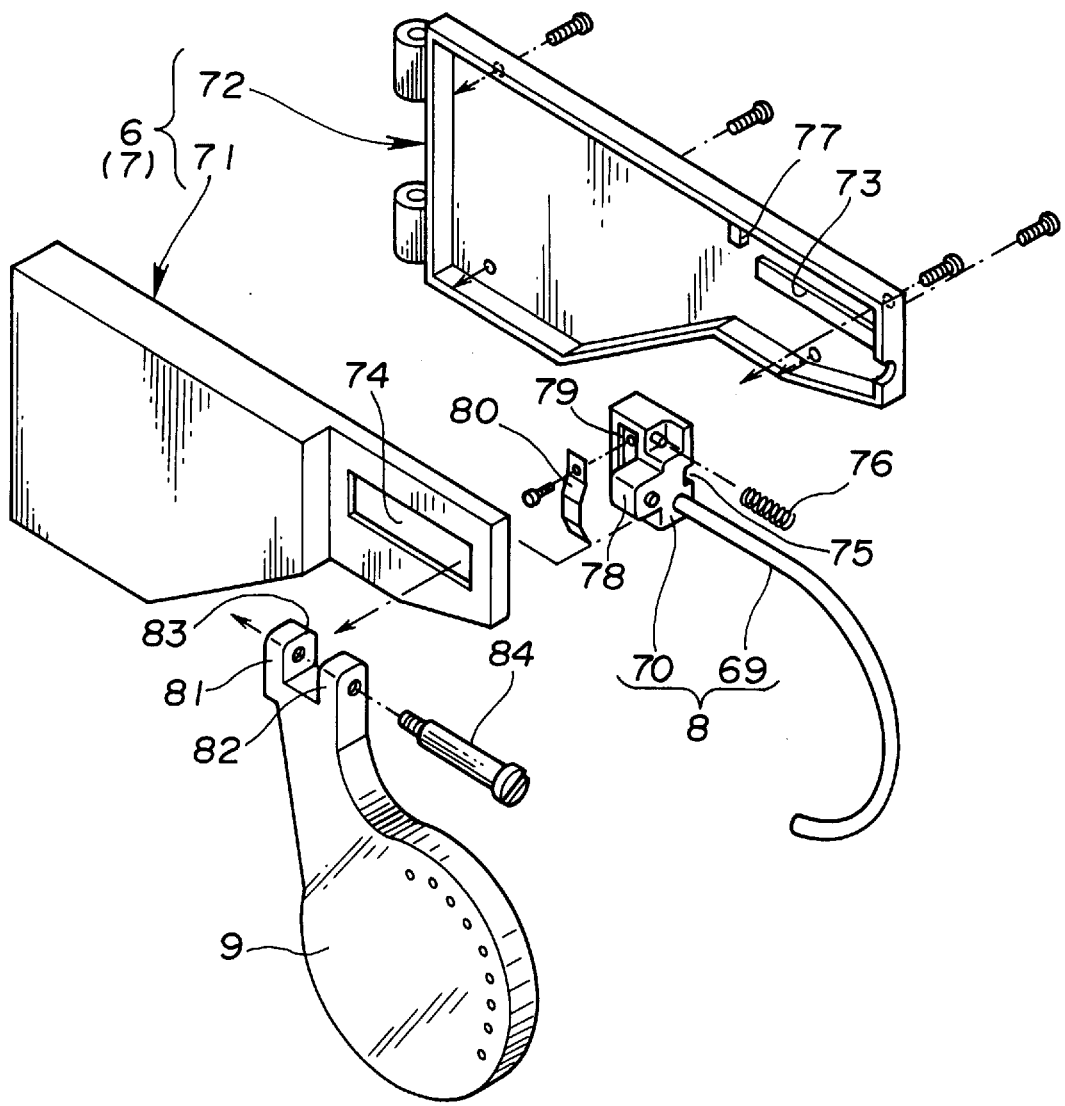
FIG. 8 is an exploded perspective view of the bow used in the goggle type image display apparatus of FIG. 5.

Referring to FIG. 8, the sidepiece 8 includes a bow 69 turned at its one end in a U-shaped form and a slider 70 mounted on the other end of the bow 69. Each of the side covers 6 and 7 are divided into left and right halves 71 and 72. A slide guide rail 73 is projected on the inner peripheral surface of one 72 of the halves for guiding the sliding movement of the sidepiece 8 and the earphone 9. An elongated window 74 is formed in the other half 71. The elongated window faces to the slide guide rail 73. The slide guide rail 73 and the window 74 are utilized to attach the sidepiece 8 and the earphone 9 to the side covers 6 and 7 for sliding movement. A rail receipt groove 75 is formed in one side surface of the slider 70. The slide guide rail 73 engages with the rail receipt groove 75 so that the slider 70 can be mounted on the slide guide rail 73 for sliding movement. The slider 70 is urged for sliding movement along the slide guide rail 73 into pressure contact with a stopper 77 provided on the half 72 under the resilient force of a coil spring 76. A bearing piece 78 projects from the other side surface of the slider 69. The bearing piece 78 has a tip portion extending outwardly through the window 74. A recess 79 is formed in the side surface of the bearing piece 78. A leaf spring 80 is mounted in the recess 79 to maintain the earphone at its vertical position (when the apparatus is worn on the ear) or its horizontal position (when the apparatus is not worn on the ear).

The structure of the earphones 9. Left and right bearing pieces 81 and 82 are formed on the upper end portions of the earphone 9. The bearing piece 81 is formed with a projection 83 pushed by the leaf spring 80. The projection 83 is inserted in the recess 79 formed in the slider 70. A stepped screw 84 is used to couple the bearing pieces 78, 81 and 82 with the bearing piece 78 being held between the left and right bearing pieces 81 and 82 so that the earphone 9 can be attached rotatably to the tip end of the slider 70. When the earphone 9 is in its vertical position, the one side surface of the projection 83 is pushed under the resilient force of the leaf spring 80 to push the earphone 9 against the one half 71. As a result, the earphone 9 is held in its vertical position. When the earphone 9 is rotated upward at about 90 degrees from the vertical position, the other side surface of the projection 83 is pushed under the resilient force of the leaf spring 80 to hold the earphone 9 at its horizontal position.

When the goggle type image display apparatus is arranged 1 is worn with the bows 69 being put on the respective ears, the earphones 9 are held at the horizontal positions to avoid the interface. When the eye lenses 14 are adjusted into alignment with the respective eyes, the coil spring 76 will expands or compress to automatically adjust the positions of the sidepieces 8 and the earphones 9. Thereafter, the earphones 9 may be moved to the vertical position to place the earphones 9 into the worn condition.

The mechanism for adjusting the positions of the sidepieces 8 and the earphones 9 is not limited to the illustrated one. A rack and pinion mechanism may be used.

Figure 9:
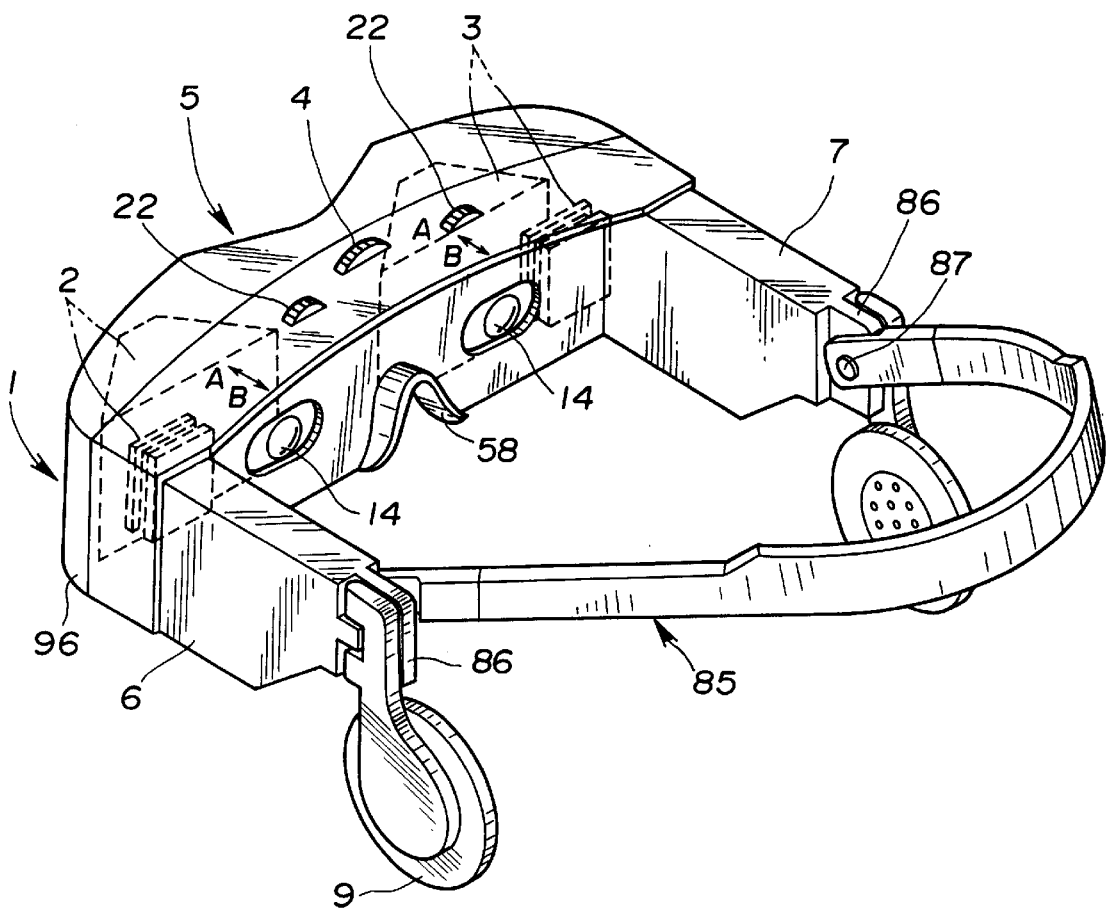
FIG. 9 is a perspective view showing an alternative embodiment of the goggle type image display apparatus of the invention.
Figure 10:
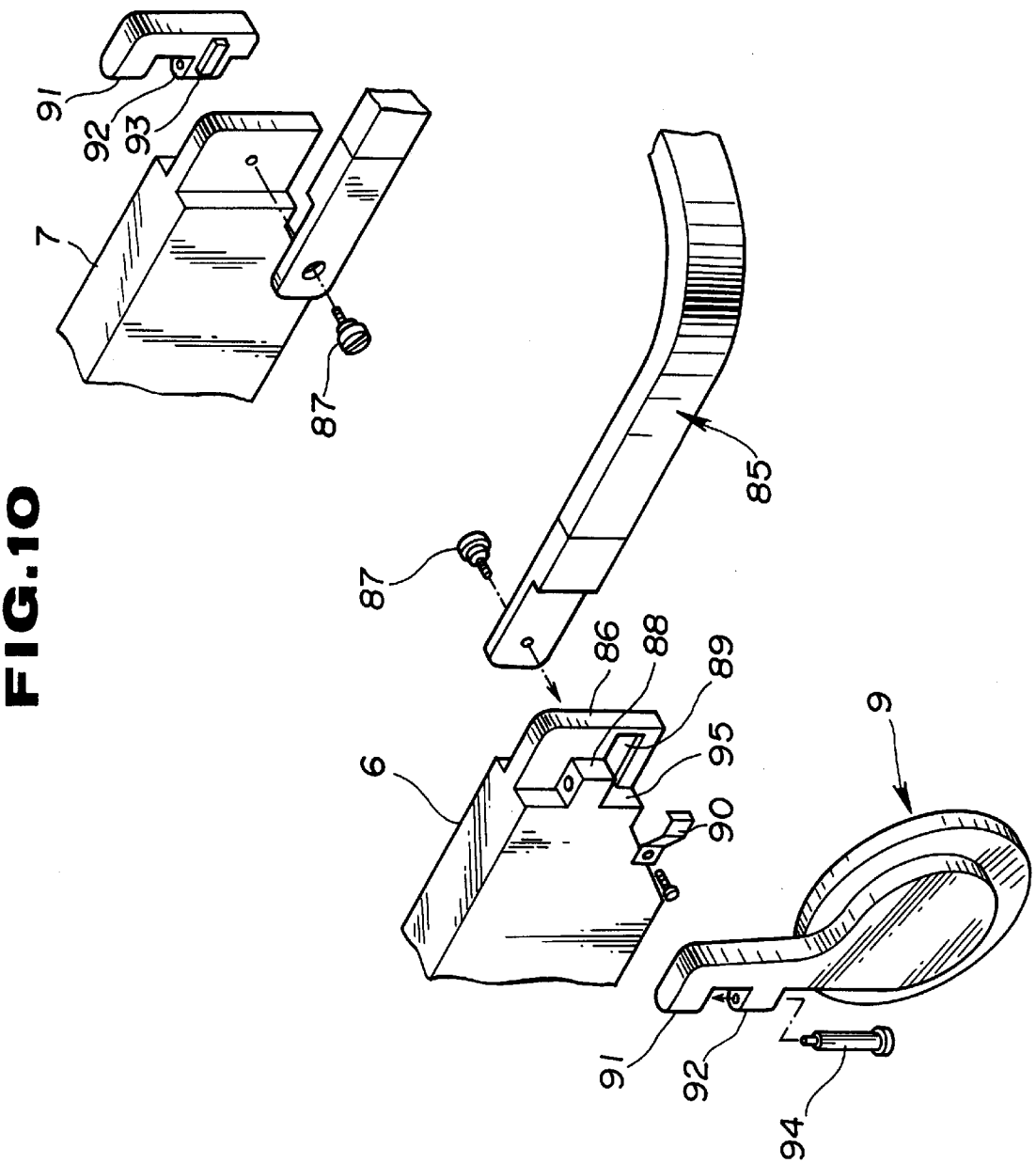
FIG. 10 is an exploded perspective view showing the headband and earphone attaching mechanism used in the goggle type image display apparatus of FIG. 9.

Referring to FIGS. 9 and 10, there is illustrated a third embodiment of the goggle type image display apparatus of the invention. Like reference numerals have been applied to FIGS. 9 and 10 with respect to the equivalent components used in the first and second embodiments.

In this embodiment, the left and right side covers 6 and 7 are formed at one ends thereof with flanges 86 and 86 for attachment of the head band 85. The opposite ends of the head band 85 are rotatably mounted through stepped bolts 87 on the facing inner side surfaces of the flanges 86 and 86. The head band 85 is arranged to have an adjustable length. The head band can rotate through about 90 degrees between its horizontal and vertical positions with respect to the side covers 6 and 7.

Referring to FIG. 10, bearings 88 are provided centrally on the outer side surfaces of the left and right flanges 86 and 86 for attachment of the earphones 9. A recess 89 is formed in the lower portion of the outer side surface of each of the flanges 86 and 86 for receipt of the corresponding one of leaf springs. A leaf spring 90 is mounted in the recess 89 to maintain the corresponding earphone 9 at its vertical position aligned with the side cover 6 or 7 (when the apparatus is worn on the ear) or its vertical position rotated outward from the side cover 6 or 7 (when the apparatus is not worn on the ear).

Description will be made to the structure of the earphones 9. Left and right bearing pieces 91 and 92 are formed on the upper end portions of the earphone 9. The bearing piece 92 is formed with a projection 93 pushed by the leaf spring 90. The projection 93 of the earphone 9 is inserted in the recess 89 formed in the outside surface of the flange 86. A stepped screw 94 is used to couple the bearing pieces 88, 91 and 92 with the bearing piece 88 being held between the left and right bearing pieces 91 and 92 so that the earphone 9 can be attached rotatably to the flange 86. When the earphone 9 is rotated in alignment with a respective side cover 6 or 7, the one side surface of the projection 93 is pushed under the resilient force of the leaf spring 90 to push the earphone 9 against the outer side surface of the flange 86. As a result, the earphone 9 is held in alignment with the side cover 6 or 7. When the earphone 9 is rotated outward at about 90 degrees from this position, the other side surface of the projection 93 is pushed under the resilient force of the leaf spring 90 to hold the earphone 9 in pressure contact with the end surface 95 of the side cover 6 or 7 so that it can be held normal to the respective side cover 6 or 7.

When the goggle type image display apparatus 1 of this embodiment is put on the head like a goggle, it is brought into an open condition where the head band 85 is rotated upward at about 90 degrees and the left and right earphones 9 and 9 are rotated outward at about 90 degrees. Thereafter, the head band 85 is inclined at a desired angle to hook the head band 85 on the rear portion of the head. The left and right earphones 9 and 9 are rotated inward at about 90 degrees so that the left and right earphones 9 and 9 are closed and put on the ears.

Figure 11:
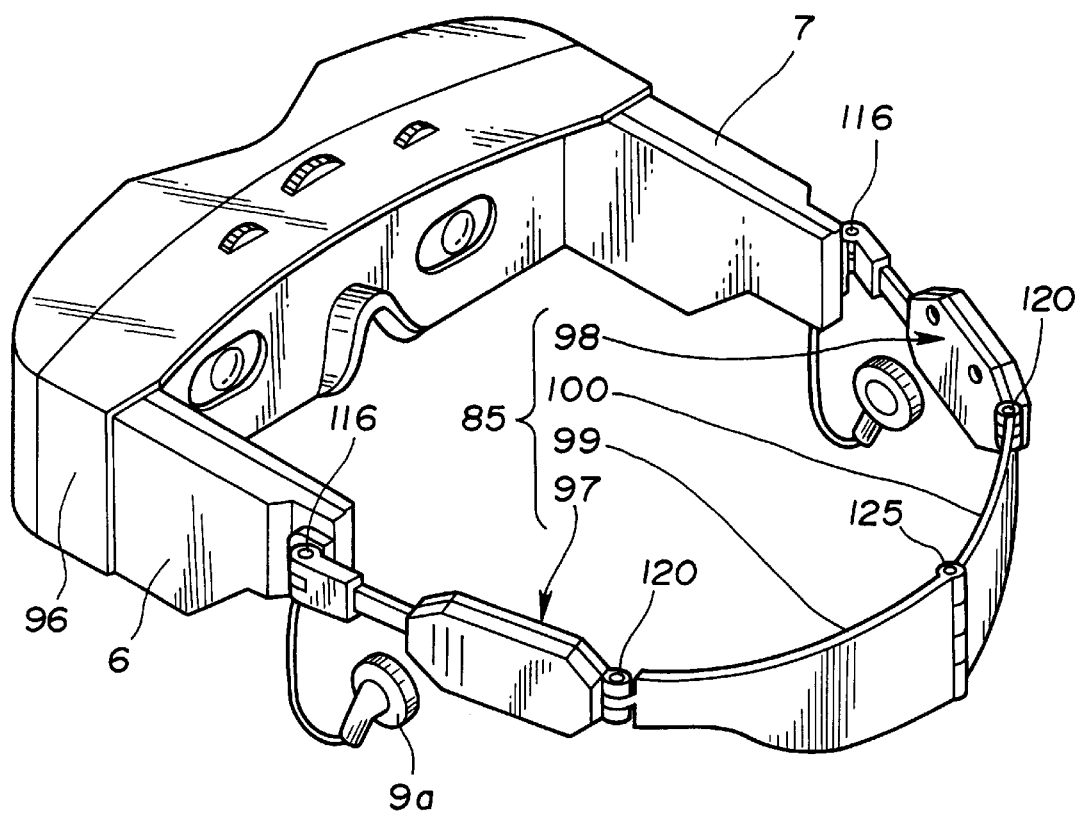
FIG. 11 is a perspective view showing another type of head band which may be used in the goggle type image display apparatus of the invention.
Figure 12:
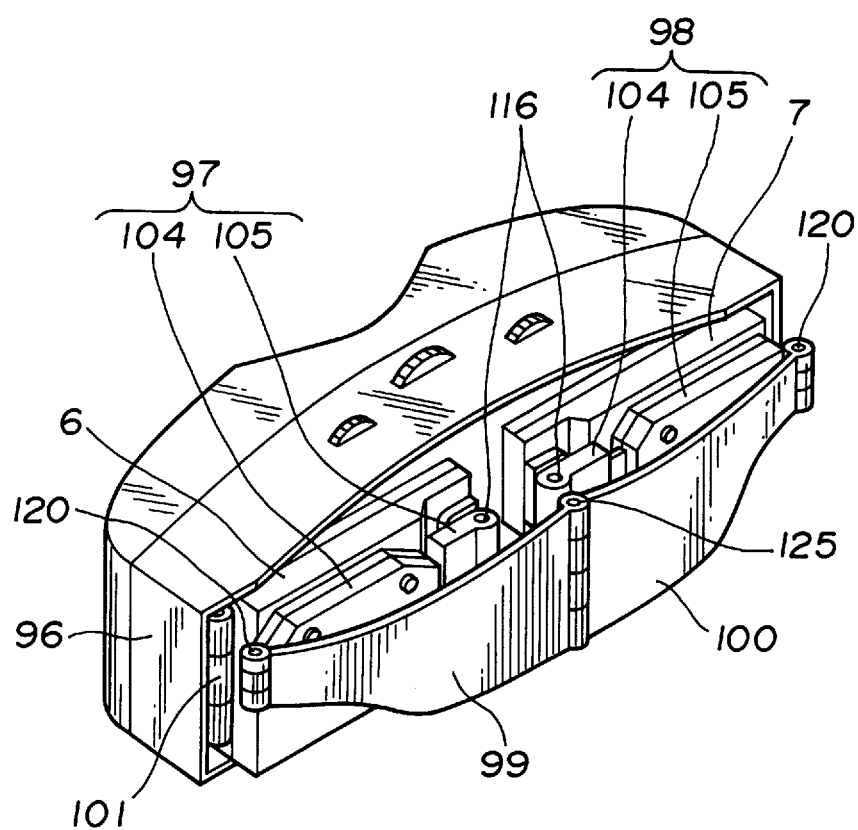
FIG. 12 is a perspective view showing the head band of FIG. 11 in its folded condition.
Figure 13:
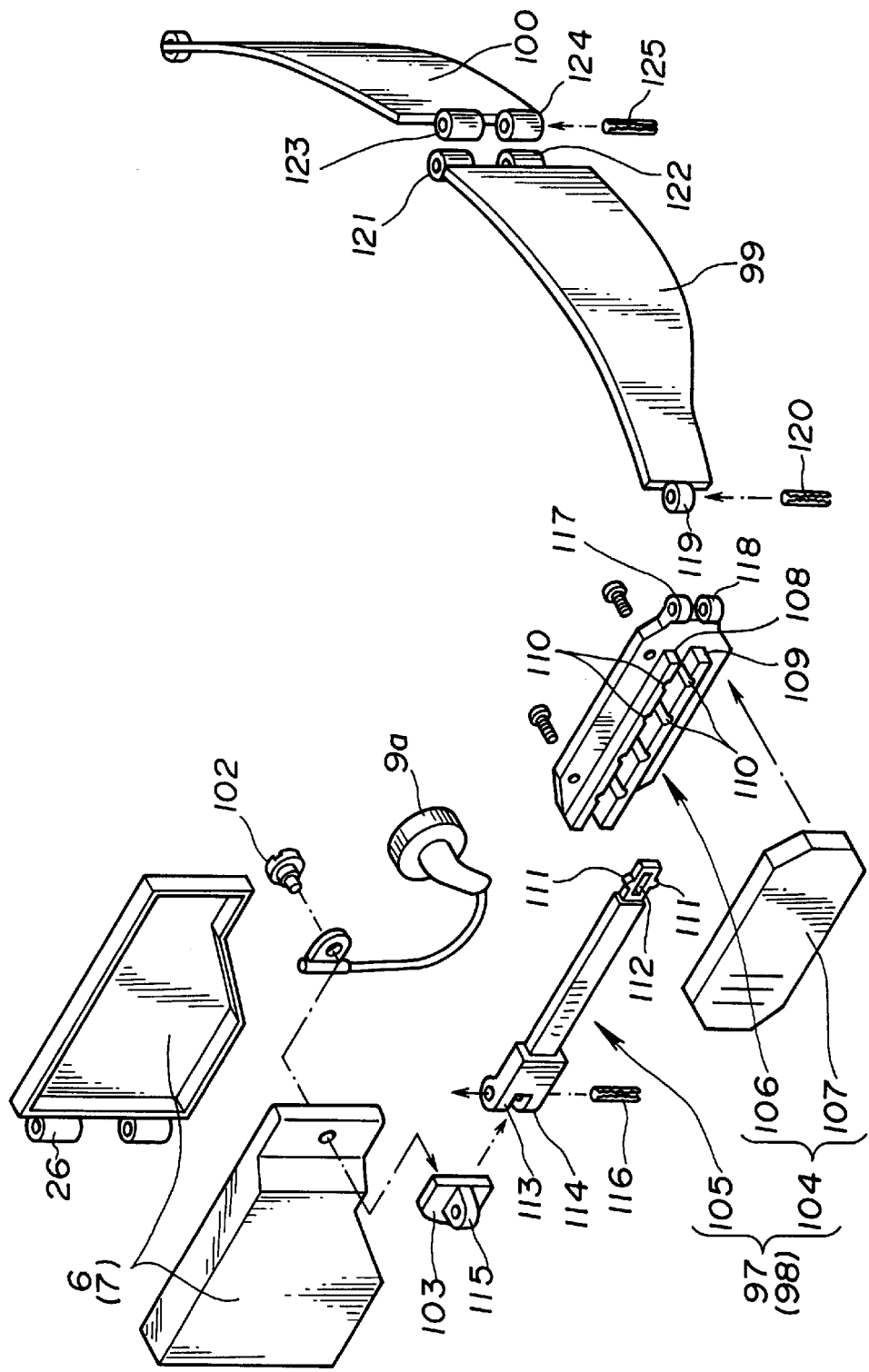
FIG. 13 is an exploded perspective view showing the head band of FIG. 11.

Referring to FIGS. 11 to 13, there is illustrated another embodiment of the goggle type image display apparatus of the invention. In this embodiment, the head band can be folded to allow the apparatus to be carried conveniently. The left and right side covers 6 and 7 are foldably attached to the cover main portion 96. The head band 85 has its opposite ends attached to the left and right side covers 6 and 7 and it is divided into left and right elastic band portions 97 and 98 and left and right non-elastic band portions 99 and 100. The side covers 6 and 7 are rotatably attached at their one ends to the cover main portion 96 through a hinge 101 (FIG. 12) and at the other ends thereof to a band bracket 103 through a stepped bolt 102 (FIG. 13). The elastic band portions 97 and 98 of the band 85 is attached to the band bracket 103. Each of the elastic band portions 97 and 98 includes a holder 104, and a slider 105 attached to the holder 104 for sliding movement. The holder 104 includes a holder main portion 106 and a cover portion 107. The holder main portion 106 is provided on its one side surface with upper and lower slide guide rails 108 and 109. The slide guide rails 108 and 109 are formed in their facing surfaces with grooves 110 . . . 110 at predetermined intervals for positioning the slider.

The slider 105 is inserted between the upper and lower slide guide rails 108 and 109 for sliding movement along the slide guide rails 108 and 109. Upper and lower projections 111 and 111 are forme on the upper and lower surfaces of the one end portion of the slider 105. The projections 111 and 111 engage with the grooves 110 and 110 formed in the facing surfaces of the upper and lower slide guide rails 108 and 109 to position the slider 105. The numeral 112 designates a slot formed in the one end portion of the slider 105 between the projections 111 and 111. The slot 112 is effect to engage and disengage the projections 111 and 111 with the grooves 110 and 110 in a resilient manner during the sliding movement of the slider 105. The slider 105 is provided at the other end thereof with upper and lower bearing pieces 113 and 114. The band bracket 103 has a bearing piece 115 rotatably attached to the slider between the bearing pieces 113 and 114 by means of a spring pin 116. The holder main portion 106 is provided at its one end with upper and lower bearing pieces 117 and 118. The elastic band portions 97 and 98 and the non-elastic band portions 99 and 100 are foldably coupled by means of spring pins 120 each of which extends through a bearing piece 119 formed on one end of the corresponding one of the non-elastic band portions 99 and 100 inserted between the bearing pieces 117, 118 and 119. The left and right non-elastic band portions 99 and 100 are provided at their end portions with bearing pieces 121, 122, 123 and 124, respectively. These bearing pieces 121 to 124 are stacked and coupled by means of a spring pin 125 so as to rotatably couple the left and right non-elastic band portions 99 and 100. The numeral 9a designates earphones.

When the goggle type image display apparatus 1 of this embodiment is put on the head like a goggle, the head band 85 is rotated upward at about 90 degrees through the band bracket 103 with the elastic band portions 97 and 98 being used to expand the head band 85. Thereafter, the head band 85 is inclined at a desired angle to fasten the head band 85 into pressure contact with the rear portion of the head so that the goggle type image display apparatus is certainly put around the head by the head band 85. After the goggle type image display apparatus has been used, the left and right side covers 6 and 7 are turned or folded over the cover main portion 96, the left and right elastic band portions 97 and 98 are folded over the side covers 6 and 7, and the non-elastic band portions 99 and 100 are superpositioned on the elastic band portions 97 and 98 so that the left and right side covers 6 and 7 and the head band 85 can be folded into a small size for convenient of carrying, as shown in FIG. 12.

In the goggle type image display/apparatus of the invention, the left and right optical blocks and the optical block distance adjusting mechanism are attached on the support frame and the support frame is attached to the housing. Thus, the following effects are obtained:

(1) The required mechanical strength can be reduced and the structure can be simplified as compared to the arrangement where the optical blocks and the optical block distance adjusting mechanism are attached directly to the housing.

(2) The positions of the optical blocks and the optical block distance adjusting mechanism can be adjusted before the support frame is attached to the housing. The support frame can be removed from the housing to adjust the optical blocks with ease after the apparatus has been assembled once.

What is claimed is:

1. A goggle type image display apparatus wearable on a user's head for presenting a visible image thereon, comprising:

left and right optical blocks each having display means for representing an image thereon;

distance adjusting means connected to said left and right blocks for adjusting the distance between the left and right blocks;

a goggle-shaped housing for containing the left and right optical blocks;

a support frame mounted to said housing for supporting said left and right blocks and said distance adjusting means, wherein said support frame slidably supports the left and right optical blocks and said distance adjusting means is mounted on the support frame for sliding the left and right optical blocks along the support frame toward and away from each other within the housing;

wherein the housing comprises a main cover portion, and left and right side covers attached to the opposite sides of the main cover portion, and which comprises a head band expandable in a longitudinal direction, the head band being rotatably attached at one end thereof to one end of one of the side covers and at the other end thereof to one end of the other side cover;

wherein each of the side covers is rotatable attached at one end thereof through a hinge to the main cover portion and at the other end thereof through a band bracket to the head band; and wherein the head band includes a pair of elastic band portions each rotatably attached at one end thereof to the respective side cover, and a pair of non-elastic band portions rotatably attached at one end thereof to each other and at the other end thereof to the other end of the respective elastic bands.

2. A goggle type image display apparatus wearable on a user's head for presenting a visible image thereon, comprising:

left and right optical blocks each having display means for representing an image thereon;

distance adjusting means connected to said left and right blocks for adjusting the distance between the left and right blocks;

a goggle-shaped housing for containing the left and right optical blocks;

a support frame mounted to said housing for supporting said left and right blocks and said distance adjusting means, wherein said support frame slidably supports the left and right optical blocks and said distance adjusting means is mounted on the support frame for sliding the left and right optical blocks along the support frame toward and away from each other within the housing;

wherein the housing comprises a main cover portion, and left and right side covers are attached to opposite sides of the main cover portion, each of said side covers having an earphone; and further comprising earphone attaching means for attaching each earphone to a corresponding one of said side covers for rotation about a vertical axis.

3. The goggle type image display apparatus as claimed in claim 2, wherein said earphone attaching means further comprises means for retaining the position of the earphone rotated at a predetermined angle about the vertical axis.

* * * * *

UNITED STATES PATENT AND TRADEMARK OFFICE
CERTIFICATE OF CORRECTION

PATENT NO. : 5,880,773
DATED : March 9, 1999
INVENTOR(S) : Yoshiaki SUZUKI

It is certified that error appears in the above-identified patent and that said Letters Patent is hereby corrected as shown below:

In the claims:

Claim 1 should read:

-- 1. A goggle type image display apparatus wearable on a user's head for presenting a visible image thereon, comprising:

left and right optical blocks each having display means for representing an image thereon;

distance adjusting means connected to said left and right blocks for adjusting the distance between the left and right blocks;

a goggle-shaped housing for containing the left and right optical blocks.

UNITED STATES PATENT AND TRADEMARK OFFICE
CERTIFICATE OF CORRECTION

PATENT NO. : 5,880,773
DATED : March 9, 1999
INVENTOR(S) : Yoshiaki SUZUKI

It is certified that error appears in the above-identified patent and that said Letters Patent is hereby corrected as shown below:

a support frame mounted to said housing for supporting said left and right blocks and said distance adjusting means, wherein said support frame slidably supports the left and right optical blocks and said distance adjusting means is mounted on the support frame for sliding the left and right optical blocks along the support frame toward and away from each other within the housing;

wherein the housing comprises a main cover portion, and left and right side covers attached to the opposite sides of the main cover portion, and which comprises a head band expandable in a longitudinal direction, the head band being rotatably attached at one end thereof to one end of one of the side covers and at the other end thereof to one end of the other side cover;

wherein each of the side covers is rotatably attached at one end thereof through a hinge to the main cover portion and at the other end thereof through a band bracket to the head band; and

UNITED STATES PATENT AND TRADEMARK OFFICE
CERTIFICATE OF CORRECTION

PATENT NO. : 5,880,773
DATED : March 9, 1999
INVENTOR(S) : Yoshiaki SUZUKI

It is certified that error appears in the above-identified patent and that said Letters Patent is hereby corrected as shown below:

wherein the head band includes a pair of plastic band portions each rotatably attached at one end thereof to the respective side cover, and a pair of non-elastic band portions rotatably attached at one end thereof to each other and at the other end thereof to the other end of the respective elastic bands. --

Signed and Sealed this

Seventeenth Day of August, 1999

Q. TODD DICKINSON

Attest:

Attesting Officer

Acting Commissioner of Patents and Trademarks